United States Patent [19]

Rougeot et al.

[11] 4,101,770

[45] Jul. 18, 1978

[54] CAMERA ARRANGEMENT FOR SCINTIGRAPHY

[75] Inventors: Henri Rougeot; Guy Roziere, both of Paris, France

[73] Assignee: Thomson-CSF, Paris, France

[21] Appl. No.: 796,342

[22] Filed: May 12, 1977

[30] Foreign Application Priority Data

May 18, 1976 [FR] France .................... 76 14957

[51] Int. Cl.$^2$ ............................ G01T 1/20
[52] U.S. Cl. ................................ 250/363 S
[58] Field of Search ............. 250/363 S; 235/151.35

[56] References Cited

U.S. PATENT DOCUMENTS 4,013,878 3/1977 Wagner .................... 250/363 S X

*Primary Examiner*—Davis L. Willis
*Attorney, Agent, or Firm*—Roland Plottel

[57] ABSTRACT

In scintigraphic cameras according to the invention, the treatment of the signals generated by each point of the image in the observation elements is carried out in two steps: a first device with a relatively short delay (0.55μs) roughly localises the point and, at the same time, eliminates the signals outside a given energy band and corrects any inequalities of gain from one point to another of the image; a second device with a longer delay (3μs), which receives the same signals, with a delay equal to that of the first device, and the results of the treatment effected in the latter, defines the precise position of each point.

2 Claims, 2 Drawing Figures

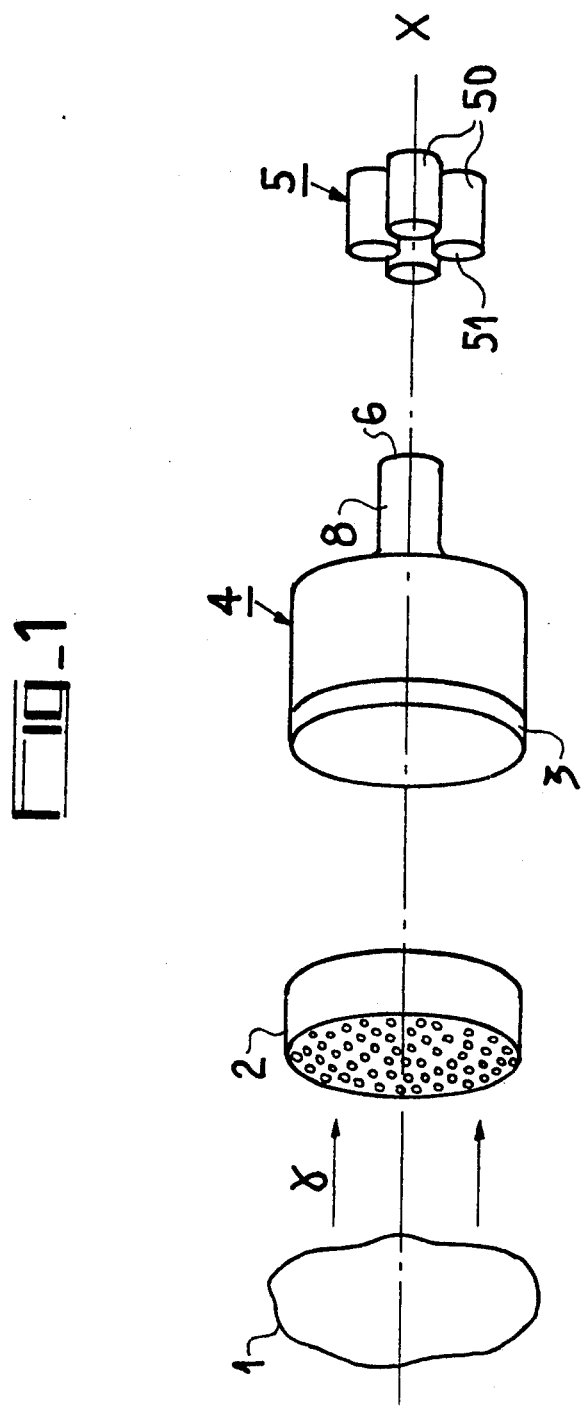

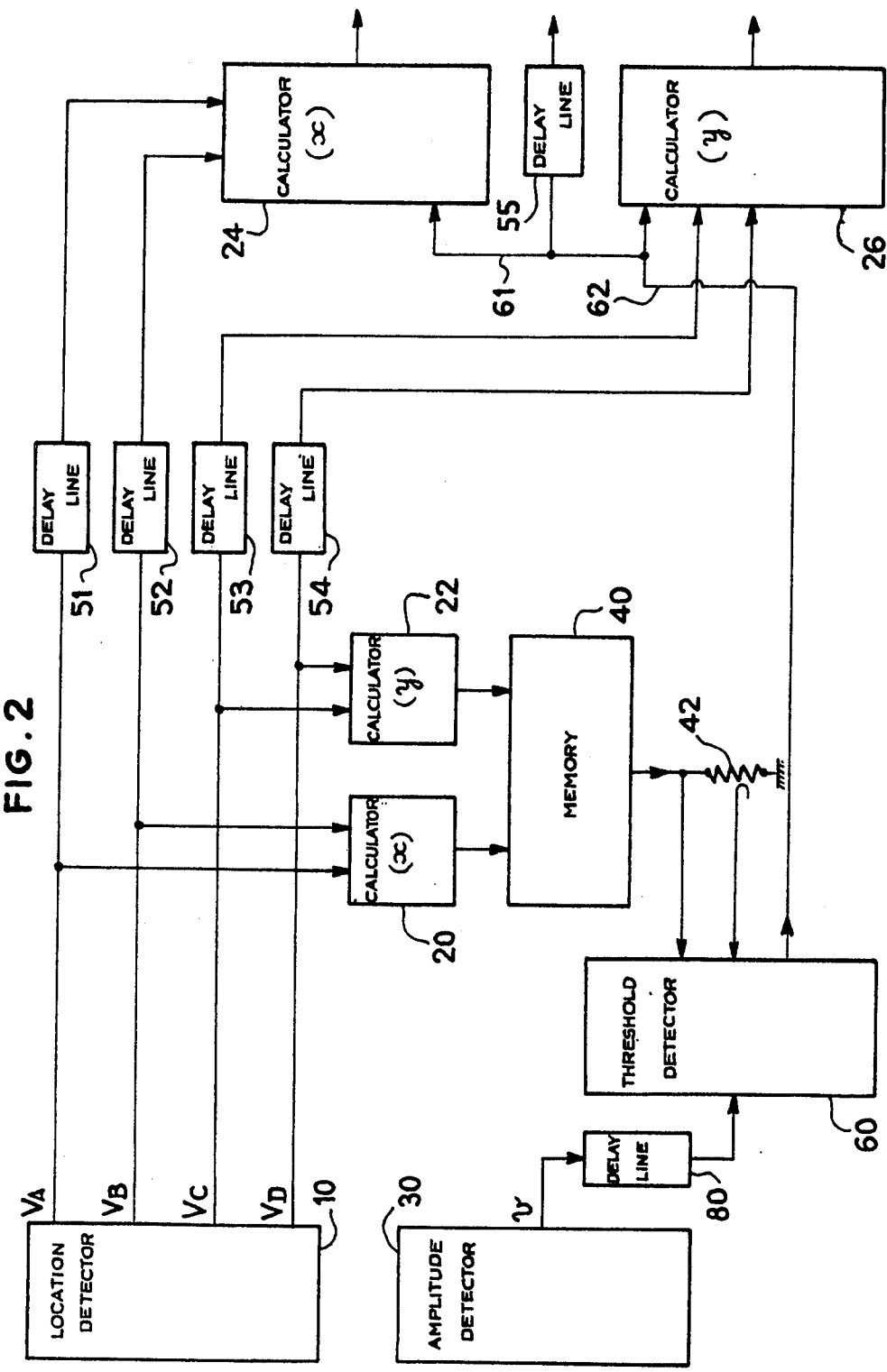

CAMERA ARRANGEMENT FOR SCINTIGRAPHY

This invention relates to a camera arrangement for scintigraphy.

An arrangement of this type, which is used in particular in medicine for observing organs of the human body, consists of a chain, in which is formed the image of the subject subjected to the action of an unstable isotope, and of a device for treating all the constituent signals of the image in question. These signals are those of elements, generally four in number, which are an integral part of the chain, are disposed in such a way as to observe each of the points of this image and to each of which corresponds a signal.

In these chains, the image is generally attended by a fault known as spatial non-uniformity of gain. The energies of the image points are not proportional to the energies emitted by the points of the subject in the form of radioactive radiation. The energy of the image points in question may also be a luminous energy when the image in question is that formed on a luminescent screen under the impact of the photoelectrons emitted by a photocathode, as is the case with numerous prior-art chains, and in this case the elements in question are photomultipliers at the output of which are collected electrical signals corresponding to the luminous points observed. However, it may also consist of electrical energy when, again according to the prior art, this image is an electronic image collected at the output of an electron multiplier disposed in the path of the photoelectrons (see U.S. Patent Application filed on 27th Dec., 1976 under Number 754,234. In this case, as in the preceding case, the image is rarely free from this fault of non-uniformity for various reasons, such as the non-uniformity of the emission of the photocathode itself, the distortions of the image intensifier tubes of the chain, the presence of optical filters at the input and output ends of the chain, etc. The function of the signal-treatment unit is to eliminate this fault. However, its function is not confined to this correction. In addition to effecting this correction, it also has to eliminate the energy emitted by a point of the subject other than that of the radioactive radiation which it emits when the atoms of the unstable isotope reach this point, by interception of the radiation of the adjacent points and diffusion after conversion by Compton effect. An energy window or compartment with a given width is selected around the energy level corresponding to the characteristic radiation of the unstable isotope used. It is only the radiation of which the level is comprised within this window that is retained as significant or useful during the treatment. Finally, the treatment unit performs the function of precisely localising the image point observed and the corresponding subject point. In the present context, points are obviously not points in the geometric sense of the word, but zones with a certain surface area.

In the case of the prior art chains, these various functions are simultaneously performed by the same treatment unit.

Now, the correction of spatial non-uniformity of gain of the image has to be rapidly effected because the successive pulses emitted by the subject point follow one another in a rapid sequence, whereas on the other hand localisation of the point, if it is to be precise, takes a relatively long time which is considerably longer than that acceptable for the correction of non-uniformity.

In the prior art, these opposing requirements are reconciled by improving the precision with which the position of the point is calculated by using a high-gain intensifier tube. If, for each point, $V_A$, $V_B$, $V_C$ and $V_D$ represent the signals of the observation elements of the image, assumed to be four in number and disposed at the apex of a square, the position of the point observed is given by the ratios $(V_A - V_B/V_A + V_B)$ and $(V_C - V_D/V_C + V_B)$ which are proportional to the cartesian coordinates of the point relative to two axes $x$, $y$ of the plane of the image, whilst the sum of these signals represents the energy of the image point. It can be seen from these formulae that the precision obtained will be greater, all other things being equal, the greater the signals $V_A$, $V_B$, $V_C$ and $V_D$, i.e., the higher the gain of the image intensifier. For this reason, it is generally necessary to use several intensifiers in a cascade arrangement which is a disadvantage in itself as a result of the addition of the faults inherent in each of them. Microchannel electron multipliers may also be used in order to increase gain.

However, this increase in gain, which is useful in particular for increasing the precision of the localising operation, affects the window width to be provided. In the absence of any separate compensation of the spatial inequalities of gain of the image, this width increases with the gain and so does the danger that the energy of diffused rays will be included within this window. Separate compensation of the gain, for example by a film of matched non-uniform opacity (see U.S. Patent Application filed on 21th May, 1976 under Number 688611), secured to the output screen of the final stage of a cascade of intensifiers, enables this difficulty to be obviated, but at the price of another disadvantage, namely that of ageing of the intensifier tubes which means that the correction valid at the outset is no longer adjusted after a certain period of operation. It follows from the foregoing that it is not possible without disadvantages to effect the simultaneous correction of spatial non-uniformity of gain and the localisation of the point observed at the same time moreover, as has been seen, as the separation of the radiation directly emitted by a point from that diffused by the same point.

It is for this reason that, in the scintigraphic camera arrangements according to the invention, these operations are entrusted, contrary to the prior art, to a treatment system in two parts and are carried out in two steps under conditions which will be explained in the following description in conjunction with the accompanying drawings. Each of these parts comprises delay elements, the delay times being different in the two parts.

In the accompanying drawings:

FIG. 1 is a diagrammatic view of a scintigraphic camera chain according to the prior art.

FIG. 2 is a diagram of the treatment system associated with such a chain in the arrangements according to the invention.

FIG. 1 diagrammatically illustrates, in an exploded view, the constituent elements of a scintigraphic camera chain. Beyond the subject 1 into which atoms of a radioactive substance have been injected, this FIG. shows a collimator 2 which is made of tubes of a material highly absorbent to the incident radiation emanating from the subject and of which the function is to make a point of the input screen 3 of the intensifier assembly 4 correspond to each point of the subject. These tubes are lead tubes for example. Their diameter is always at least of the order of 1 millimetre, which explains the fact that the image of a point of the subject produced by the intensifier assembly is a zone with a certain surface area. The assembly 4, shown in the FIG. as being formed by a single tube, may consist of a succession of several tubes in a cascade arrangement so as to increase the gain. The input screen comprises a scintillator and a photocathode, the scintillator absorbing the incident radiation and converting it into photons of the spectrum of radiation to which the photocathode is sensitive. These two parts have not been shown in detail in the FIG. At the end of the neck 8 of the intensifier 4 of the assembly there is disposed a cathodoluminescent screen 6 on which the electrons emitted in operation by the photocathode of the screen 3 produce an impact and a light trace. This trace is observed by an assembly 5 of four photomultipliers 50 of which the photocathodes, such as that denoted by the reference 51 in the drawing, flat like the screen 6, are situated in a plane parallel to that of the screen 6 and have their centres disposed at the apex of a square having the same axis X as the assembly.

The signals supplied by these multipliers are the preceding signals $V_A$, $V_B$, $V_C$ and $V_D$ which are treated under the conditions mentioned above by a system to which they are delivered on leaving the photomultipliers. More information on these prior art chains may be obtained by consulting G. ROUX, J. C. GAUCHER, A. LANSIART, J. LEQUAIS - "Detecteur photo-electrique analogique de la position de scintillations faiblement lumineuses". Advances in Electronics and Electron Physics. Fifth Symposium on Photo Electronic Image Devices. Academic Press, 1972, pp. 1,017, 1,029.

The example described above is that of a chain where the signal observed is a luminous signal produced by a luminescent screen, denoted by the reference 6 in the drawing, and the elements of the observation arrangement 5 are photomultipliers. As has already been pointed out, and according to the prior art, the image observed at the output of the last intensifier stage may also be formed in other versions by the output signals of a microchannel electron multiplier tube. In this case, the signals received are, for example, those of four conductive plates disposed in the same way as the photocathodes of the preceding photomultipliers to intercept the electrons emerging from the electron multiplier which is exposed at its other surface to the incident photoelectrons. The invention is equally applicable to either case. It concerns the treatment of these signals so as to avoid the disadvantages referred to above irrespective of the way in which these signals are produced and their number for each point. In the foregoing, the case of four signals has been taken as an example on the understanding that this number may be different, i.e., smaller or greater, within the scope of the invention. According to the invention, this treatment is effected in the manner which will now be described with reference to FIG. 2.

In this FIG., the reference 10 denotes the localisation detector referred to earlier on, namely the assembly 5 in FIG. 1, at the output of which the signals of each point of the image observed are successively extracted. In the interests of clarity, it will be assumed by way of example, in the same way as before and without any limitation being implied, that there are four of these signals for each point. As in the example of FIG. 1, the signals will be denoted $V_A$, $V_B$, $V_C$ and $V_D$. Two of them are reserved for determining the abscissa and the other two for determining the ordinate of the point relative to two co-ordinate axes $x$ and $y$ of the plane of the image observed. The first two of these signals $V_A$ and $V_B$ are delivered to a first calculator 20 of which the function is to compute the co-ordinate $x$, whilst the other two signals $V_C$ and $V_D$ are delivered to a second calculator 22 which computes the co-ordinate $y$. This calculation is roughly effected to an accuracy of 2 to 5% in a relatively short time, for example 0.5 microsecond.

These signals are introduced into a pre-programmed memory 40 which gives the window position for each point, this position generally differing, according to the foregoing, from one point to another due to the spatial non-uniformity of gain. In one example of application, these windows correspond to energies of the incident radiation comprised between 140 KeV + 10% and 140 KeV − 10%.

On the other hand, the signal of the point observed is delivered to an amplitude detector 30 at the output of which it is delivered through a delay line 80, of which the delay is equal to the preceding computation time, to a threshold or window detector 60. This signal may be produced by addition from the four signals of the photomultipliers 50 in FIG. 1 or may be directly extracted at each point of the microchannel multiplier of the chain when it has one. It is this case which is illustrated in the example of FIG. 2 where a single signal $v$ corresponds to a point. The window detector, which comprises two thresholds (upper and lower) compares the signal received with the signal of the memory 40, to which it is connected by a potentiometer (42 in the FIG.) in a very short time, 50 nanoseconds in the example illustrated.

The window detector 60 thus makes a selection and eliminates the signals outside the window which corresponds to them. The signals remaining after this detection, i.e., the signals validated by the window selector, are delivered (arrows 61 and 62) to two calculators 24 and 26 which, on the other hand, receive with delays of 0.55 microseconds (delay lines 51 to 54) the four signals $V_A$, $V_B$, $V_C$ and $V_D$, the signals $V_A$ and $V_B$ being received by the abscissa calculator 24 and the signals $V_C$ and $V_D$ by the ordinate calculator 26.

These calculators effect the precise calculation to approximately 1/1000 of the position of the point. In view of the fact that each of these points has a certain surface area, this position is that of the barycentre of the zone observed. At this stage of the detection process, the considerable time required for a precise calculation, 3 microseconds in the example, is readily available.

The signals issuing from the calculators 24 and 26 are delivered for example to the two plate systems of a memory-equipped cathode visualisation of which the Wehnelt electrode receives the signal validated by the selector 60 with the required delay (delay line 55) for ensuring synchronism, i.e., 3.55 microseconds in the example.

With regard to the correction of spatial non-uniformity of gain effected from the information supplied by the low-precision calculators 20 and 22, it is pointed out that the precision limit of these calculators, namely 2 to 5%, does not prevent a good correction of gain provided that, as is generally the case, the image observed does not show any sudden local variations of gain.

Of course the invention is not limited to the embodiment described and shown which was given solely by way of example.

What is claimed:

1. A camera assembly for use in scintigraphy in which the image of the subject, which is subjected to the circulation of a fluid containing an unstable isotope formed by the radiation emitted by the points of the subject under the effect of said isotope, is observed by elements in which each point of the image generates a signal, and in which a system ensures the treatment of the signals generated by each of said points in such a way as, on the one hand, to detect the energy of the radiation emitted by the corresponding point of the subject when it is struck by said isotope and, on the other hand, to define its position, wherein said treatment system is in two parts consisting of two delay devices imparting unequal delays to said signals, the first of said devices, which has the shorter delay, comprising means for roughly calculating the position of the point, means for correcting the inequalities of gain between the different points of the image and means for selecting the signals which have undergone said correction so as to exclude those signals which are not comprised between two limits, namely an upper limit and a lower limit, situated on either side of the energy level of the radiation normally emitted by the points of the subject reached by said flow, the second of the said devices comprising a calculator which receives, on the one hand, the said signals with a delay equal to that imparted to said signals by the first device and, on the other hand, the signals treated in said first device and which, during a second treatment and in a time appreciably greater than the preceding delay, computes the precise position of the point from which these signals have emanated, said treatment system finally comprising means for extracting the signals after treatment.

2. A camera arrangement as claimed in claim 1, wherein said signals are four in number, wherein said means for roughly calculating the position of each point of said image consist of two calculators, of which one receives two of said signals and computes the abscissa of said point of the image, whilst the other receives the other two of said signals and computes the ordinate of said point, wherein said means for correcting said inequalities in gain consist of a programmed memory to which the preceding co-ordinates are addressed and which causes the value of the gain, which would correspond to the addressed point in the absence of said inequality, to correspond to this point, and wherein said means for selecting the signals consist of an amplitude detector extracting the energy of the signal of the point and transmitting it through a first delay line, of which the delay is equal to that required by the preceding calculators for said computations, to a detector for comparing said energy, allowing for said correction of gain, with that of a given band of energy surrounding that normally presented with the isotope used by the image points corresponding to the points of the subject reached by said isotope, said arrangement being additionally distinguished by the fact that the second of said devices consists of four delay lines each receiving one of the four said signals and of a calculator in two parts of which one is connected to the output of the two lines receiving the signals used for roughly calculating the abscissa, whilst the other is connected to the output of the two lines receiving the signals used for roughly calculating the ordinate, said lines having a delay factor equal to the sum of the delay of said first delay line and the time required for said comparison.

* * * * *